United States Patent [19]

Suzuki

[11] Patent Number: 5,257,116

[45] Date of Patent: Oct. 26, 1993

[54] HIGH DEFINITION IMAGE GENERATING SYSTEM FOR IMAGE PROCESSING APPARATUS

[75] Inventor: Yuzuru Suzuki, Kanagawa, Japan

[73] Assignee: Fuji Xerox Co., Ltd., Tokyo, Japan

[21] Appl. No.: 631,683

[22] Filed: Dec. 24, 1990

[30] Foreign Application Priority Data

Dec. 25, 1990 [JP] Japan ................. 1-335747

[51] Int. Cl.[5] ............................................. H04N 1/40
[52] U.S. Cl. ................... 358/465; 358/447;
358/448; 358/453; 358/462; 358/444; 358/500;
382/22
[58] Field of Search ............... 358/448, 75, 444, 453,
358/455, 456, 465, 447, 462; 382/22

[56] References Cited

U.S. PATENT DOCUMENTS

| | | | |
|---|---|---|---|
| 4,606,069 | 8/1986 | Johnson | 358/467 |
| 4,722,008 | 1/1988 | Ibaraki et al. | 358/456 |
| 4,724,446 | 2/1988 | Hirahara et al. | 358/459 |
| 4,817,174 | 3/1989 | Nakatani | 358/448 |
| 4,884,080 | 11/1989 | Hirahara et al. | 358/476 |
| 4,916,545 | 4/1990 | Granger | 358/456 |
| 4,920,501 | 4/1990 | Sullivan et al. | 358/457 |
| 4,953,013 | 8/1990 | Tsuji et al. | 358/448 |
| 5,038,223 | 8/1991 | Yamada | 358/453 |
| 5,050,227 | 9/1991 | Furusawa et al. | 358/448 |
| 5,079,624 | 1/1992 | Susaga et al. | 358/75 |
| 5,150,443 | 9/1992 | Daly | 358/426 |

Primary Examiner—Edward L. Coles, Sr.
Assistant Examiner—Fan Lee
Attorney, Agent, or Firm—Finnegan, Henderson, Farabow, Garrett & Dunner

[57] ABSTRACT

A high definition image generating system for an image processing apparatus for forming an image by converting multi-level data into dot impact output data of font patterns. The system comprises a block forming circuit for averaging multi-level data by a (2×2) block, an edge-direction detecting circuit for detecting an edge direction to output an edge-direction detection signal, an edge detecting circuit for detecting an edge to output an edge detection signal, and a switching circuit for switching a font pattern to be outputted to another pattern according to the edge detection signal and the edge-direction detection signal.

9 Claims, 7 Drawing Sheets

FIG. 7(a)
FIG. 7(b)
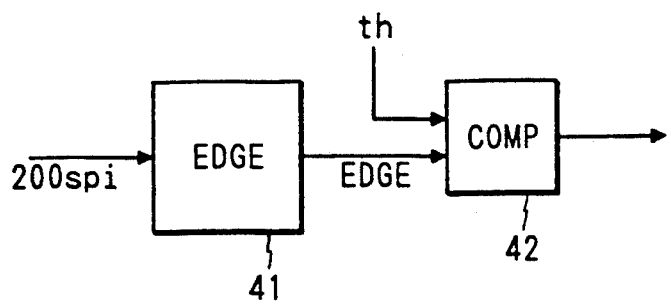
FIG. 8(a)
| A | 2B | C |
|---|----|---|
| 2D | 4E | 2F |
| G | 2H | I |
FIG. 8(b)
|  | B |  |
|---|---|---|
| D | 4E | F |
|  | H |  |
FIG. 9(a)
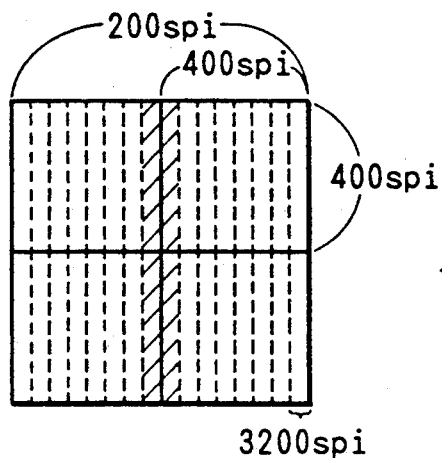
FIG. 9(b)
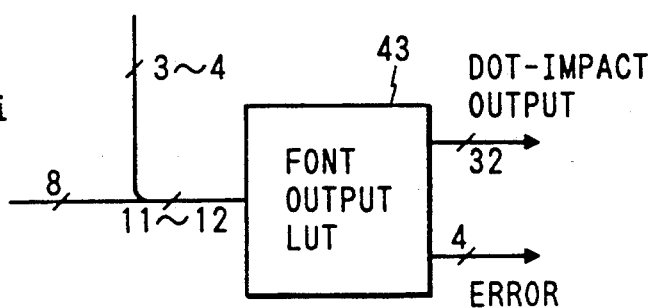

FIG. 10

| EDGE NO. | OUTPUT PATTERN |
|---|---|
| 1 | 29, 25, 21, 17, 13, 9, 5, 1, 3, 7, 11, 15, 19, 23, 27, 31 |
|   | 30, 26, 22, 18, 14, 10, 6, 2, 4, 8, 12, 16, 20, 24, 28, 32 |
| 2 | 1, 3, 5, 7, 9, 11, 13, 15, 17, 19, 21, 23, 25, 27, 29, 31 |
|   | 2, 4, 6, 8, 10, 12, 14, 16, 18, 20, 22, 24, 26, 28, 30, 32 |
| 3 | 31, 29, 27, 25, 23, 21, 19, 17, 15, 13, 11, 9, 7, 5, 3, 1 |
|   | 32, 30, 28, 26, 24, 22, 20, 18, 16, 14, 12, 10, 8, 6, 4, 2 |
| 4 | 15, 13, 11, 9, 7, 5, 3, 1, 2, 4, 6, 8, 10, 12, 14, 16 |
|   | 31, 29, 27, 25, 23, 21, 19, 17, 18, 20, 22, 24, 26, 28, 30, 32 |
| 5 | 31, 29, 27, 25, 23, 21, 19, 17, 18, 20, 22, 24, 26, 28, 30, 32 |
|   | 15, 13, 11, 9, 7, 5, 3, 1, 2, 4, 6, 8, 10, 12, 14, 16 |
| 6 | 24, 22, 20, 18, 16, 14, 12, 10, 8, 6, 4, 3, 5, 15, 17, 19, 21, 23, 25, 27, 26, 28, 30, 32, 29, 31 |
|   | 32, 31, 30, 29, 28, 27, 26, 25, 23, 21, 19, 17, 15, 13, 11, 9 |
| 7 | 9, 11, 13, 15, 17, 19, 21, 23, 25, 26, 27, 28, 29, 30, 31, 32 |
|   | 1, 2, 3, 4, 5, 6, 7, 8, 10, 12, 14, 16, 18, 20, 22, 24 |
| 8 | 1, 2, 3, 4, 5, 6, 7, 8, 10, 12, 14, 16, 18, 20, 22, 24 |
|   | 9, 11, 13, 15, 17, 19, 21, 23, 25, 26, 27, 28, 29, 30, 31, 32 |
| 9 | 32, 31, 30, 29, 28, 27, 26, 25, 23, 21, 19, 17, 15, 13, 11, 9 |
|   | 24, 22, 20, 18, 16, 14, 12, 10, 8, 6, 4, 3, 5, 15, 17, 19, 21, 23, 25, 27, 26, 28, 30, 32, 29, 31, 2, 1 |

HIGH DEFINITION IMAGE GENERATING SYSTEM FOR IMAGE PROCESSING APPARATUS

BACKGROUND OF THE INVENTION

1. Field of the Invention

The present invention relates to a high definition image generating system for an image processing apparatus which converts multi-level data into dot impact output data of font patterns.

2. Description of the Prior Art

A digital copying machine reads an image on an original document, converts the resultant analog signal into a multi-level data, performs image-quality adjustment processings, such as the adjustments of granular, tone, and definition, and reproduces the original image in the form of a mesh-dot image. In the digital copying machine, the multi-level data as digital data is used for the data processing to generate a high definition image. Because of this, various types of edits can be done using the digital data and a memory.

FIG. 11 is a block diagram showing an arrangement of a digital copying machine.

In FIG. 11, an IIT (image input terminal) 100 reads an image on a color original document in the form of separated three primary colors, B (blue), G (green), and R (red) by using a CCD line sensor, and converts the separated three color signals into digital image data. An IOT (image output terminal) 115 performs the exposure by a laser beam, and the development, and reproduces the original color image. Various processing units ranging from an END converter 101 to an IOT interface 110, which are located between the IIT 100 and the IOT 115, make up a system for editing image data, i.e., an image processing system (IPS). In the edit processing system, the image data of B, G and R are converted into toner color data of Y (yellow), M (magenta), and C (cyan), and K (black or India ink), and every developing cycle produces a toner signal corresponding to the developing color. When the separated color signals (B, G, and R signals) are converted into toner signals (Y, M, C, and K signals), the following items become problematic; how to adjust color balance, how to reproduce the colors in conformity with the read characteristic of the IIT and the output characteristic of the IOT, how to adjust the balance between density and contrast, and how to adjust edge emphasis, blur and Moire, and the like.

The IIT reads the original image, by using a CCD line sensor, with the size of 16 dots/mm for each pixel for the respective colors B, G and R, and outputs the data of 24 bits (3 colors×8 bits; 256 gray levels). The CCD line sensor is coupled with color filters of B, G, and R, and has a length of 300 mm at a density of 16 dots/mm, and makes a scan of 16 lines/mm at a process speed of 190.5 mm/sec. Therefore, it produces read data at a speed of approximately 15M pixels/sec. for each color. In the IIT, the analog data of B, G and R pixels is subjected to the logarithmic conversion. As the result of the conversion, the reflectivity information is transformed into density information, and further to digital data.

The IPS receives the separated color signals of B, G and R from the ITT, and executes various data processings to improve color reproduction, tone reproduction, definition reproduction, and the like, converts the toner signals of the developing process colors into on/off signals, and outputs them to the IOT. the IPS is made up of various types of modules; an END (equivalent neutral density) conversion module 101 for adjusting (converting) the color signals to a gray-balanced color signals, a color masking module 102 for converting the color signals B, G and R into toner quantity signals of Y, M and C by matrix-calculating the signals of B, G and R, a document-size detecting module 103 for detecting the document size in a prescan mode and erasing (frame-erasing) a platen color in a scan mode, a color conversion module 104 for converting a color in a designated area into another color according to an area signal that is applied from an area image control module, a UCR (under color removal) & black generating module 105 which generates black K of such a proper quantity as to prevent impure color, equally reduces colors of Y, M, C according to the quantity of K, removes the under color of the K, and Y, M, and C according to signals of the monocolor mode and 4-pass full color mode, a spatial filter 106 capable of removing blur and Moire, a TRC (tone reproduction control) for density adjustment, contrast adjustment, negative/positive inversion, color balance, and the like in order to improve the reproduction performance, a screen generator 109 for converting the tone toner signals of the process colors into on/off or 2-level toner signal, an IOT interface module 110, the area image control module 111 including an area generating circuit and a switch matrix, and an edit control module including an area command memory 112, a color palette video switch circuit 113, and font buffer 114, and the like.

For the separated color signals of B, G, and R from the IIT, 8-bit data (256 gray levels) is inputted to the END conversion module 101 where those are converted into toner signals of Y, M, C and K. The toner signal X of the process color is selected and converted into 2-level signal. It is outputted as on/off data of the toner signal of the process color, from the IOT interface module 110 to the IOT. In the case of the full color (4-pass full color), through the prescan, a document size, an edit area and other document information are first collected. Then, a copy cycle is first executed with the toner signal X whose developing color is Y, for example. Another copy cycle is next executed with the toner signal X whose developing color is M. Subsequently, similar copy cycles are repeated for the four image readings.

In the copying machine as mentioned above, since the removal of mesh dots results in blur, a nonlinear spatial filter to emphasize the edge and a screen generator are combined to generate a high definition image. Use of the combination leads to increase of the hardware scale. Excessive emphasis of the edge brings about unnatural emphasis of the edge. This appears as discontinuity in the reproduced image. That is, the edge portion in the image is unnaturally emphasized or the details in the image are blurred. The image quality of the reproduced image is deteriorated. In such a case, when the generation copy is progressively repeated, the image quality deterioration is amplified and enlarged.

SUMMARY OF THE INVENTION

An object of the present invention is to provide a copy of high image quality with a small scale hardware.

Another object of the invention is to remarkably improve details reproduction, and reproduction of the generation copy.

A further object of the invention is to enable data compression without deteriorating the original image.

According to the present invention, there is provided a high definition image generating system for an image processing apparatus which converts multi-level data into dot impact output data of font patterns, and outputs the converted one, the high definition image generating system as shown in FIG. 1 comprising: block-forming means 1 for averaging multi-level data by (2×2)-black data; edge- direction detecting means 1 for detecting the vertical and horizontal edge directions on the basis of density distribution patterns; edge detect means 2 for detecting an edge on the basis of a density difference between a marked pixel and pixels around the marked pixel; and a font pattern to control font output means and to be outputted being switched to another pattern on the basis of the edge detect signal and the edge-direction detect signal. With such an arrangement, when an edge is detected, a font pattern to be outputted corresponds to the edge direction. Accordingly, there is eliminated the unnatural edge emphasis and a high definition image can be reproduced.

Further, the high definition image generating system detects the edge direction on the basis of a density distribution of 2×2, which is to be converted into block data or as shown in FIG. 3, further comprises smoothing means 33 for smoothing the block data by the pixels around a marked pixel, when an edge is not detected, the smoothing means producing smoothed data. In the image generating system, font patterns corresponding to edge-direction patterns are provided for font output means, and the font pattern is selectively switched one from another according to the edge and edge-direction detect signals. Additionally, the font output means 5 contains error data owing to a gradation difference between input data and output data, the error data is fed back to the input data.

The high definition image generating system thus arranged can detect the edge and edge-directions with high precision. When the edge is not detected, the smoothed image data may be used. Even if there is a gradation difference between input data and output data, the tone reproduction performance can be improved by the error data of the error data.

BRIEF DESCRIPTION OF THE DRAWINGS

FIG. 7 shows diagrams for explaining an algorithm to detect the edge;

FIG. 8 shows diagrams for explaining an algorithm for the smoothing circuit;

FIG. 9 shows diagrams for explaining the font output circuit;

FIG. 10 is a diagram showing relationships between the edge numbers and output font patterns.

DETAILED DESCRIPTION OF THE PREFERRED EMBODIMENTS

Some specific embodiments of the invention will be described with reference to the accompanying drawings.

Figure 1:
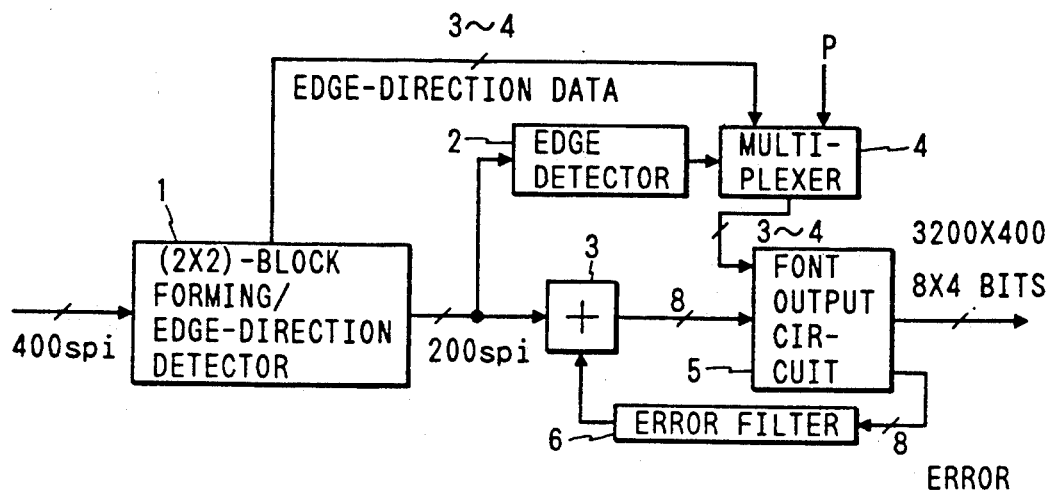
FIG. 1 is a block diagram showing an embodiment of a high definition image generating system for an image processing apparatus according to the present invention.
Figure 2:
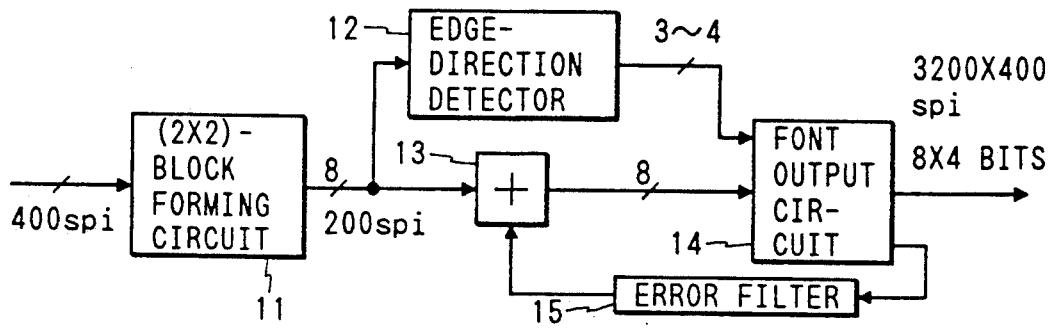
FIGS. 2 and 3 are block diagrams showing other embodiments of the high definition image generating system, respectively.
Figure 3:
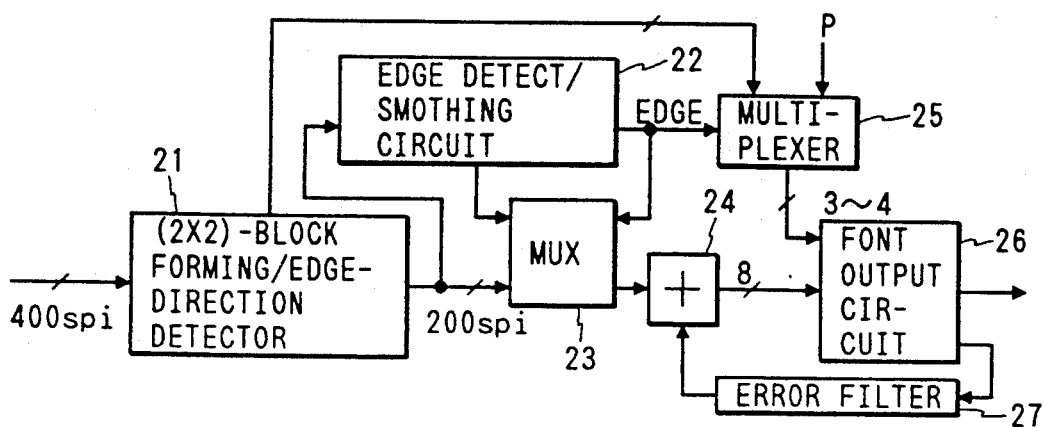

FIG. 1 is a block diagram showing an embodiment of a high definition image generating system for an image processing apparatus according to the present invention. FIGS. 2 and 3 are block diagrams showing other embodiments of the high definition image generating system.

In FIG. 1, a (2×2)-block forming/edge-direction detector 1 converts image data at 400 spi into blocks of image data at 200 spi each consisting of 4 pixels (=2×2), and averages multi-level data, and detects the direction of an edge by using the four (4) pixels. An edge detector 2 detects an edge by using the 200 spi block image data. A font output circuit 5, which contains output font pattern data, is addressed by the output signal of a multiplexer 4, and converts multi-level data that is outputted from an adder 3, into font data. Specifically, in the font output circuit 5, the multi-level data of 8 bits and 256 gray- levels is converted into the font data of 8×4 bits. An error filter 6 is provided for feeding an error contained in the font data back to the adder 3 to correct the next data. The error correction prevents a gradation of the image from being deteriorated. When the edge detector 2 detects an edge, the multiplexer 4 outputs the edge-direction data, which is detected by the (2×2)-block forming/edge- direction detector 1, to the font output circuit 5. In this case, the edge-direction data is used as address data for the font output circuit 5. When the edge is not detected, the multiplexer 4 produces fixed parameter P as the address for the font output circuit 5. Accordingly, a font pattern outputted from the font output circuit 5 when the edge is detected is different from that when the edge is not detected, even if the output data of the adder 3 applied to the font output circuit 5 remains unchanged at 8-bit and 256 gray-levels. Also when the edge is detected, the font pattern outputted from the font output circuit changes depending on the direction of the edge detected. Since the edge direction is detected by the block data of 2×2 pixels, it may be classified into one side and the other side of each of the vertical, horizontal, and oblique lines, which are applied to the data block. The font pattern data outputted from the font output circuit 5 correspond to those items classified.

In the instance as mentioned above, the image data is converted into block data of 2×2 pixels, and the edge is also detected. Another circuit arrangement is presented in FIG. 2, in which the block image data is used for detecting the edge-direction as for the edge detection. In this instance, a (2×2)-block data averaging circuit 11 averages the four pixels into multi-level data. The edge-direction detector 12 detects the edge by using the multi-level, and the edge direction as well. When the edge is detected, the edge-direction detector 12 produces data of 3 to 4 bits. When not detected, it produces the fixed parameter P as a font select signal, and serves as address data to the font output circuit 14.

An additional circuit arrangement is presented in FIG. 3, in which the edge is detected and smoothed data is generated, and when no edge is detected, the data is smoothed. In FIG. 3, a (2×2)-block/edge-direction detector 21 is the same as that shown in FIG. 1. An edge detect/smoothing circuit 22 detects the edge by using block data and outputs an edge detect signal and a smoothed signal. A multiplexer 23 selects either of the block data and smoothed data resulting from smoothing the block data in response to the edge detect signal. When the edge is detected, it allows the block data to straightforwardly go to an adder 24. When the edge is not detected, it allows the smoothed data generated by the edge detect/smoothing circuit 22 to go to the adder 24.

The algorithms for detecting the edge-direction and the edge, and the circuit arrangements implementing them will be described.

Figure 4:
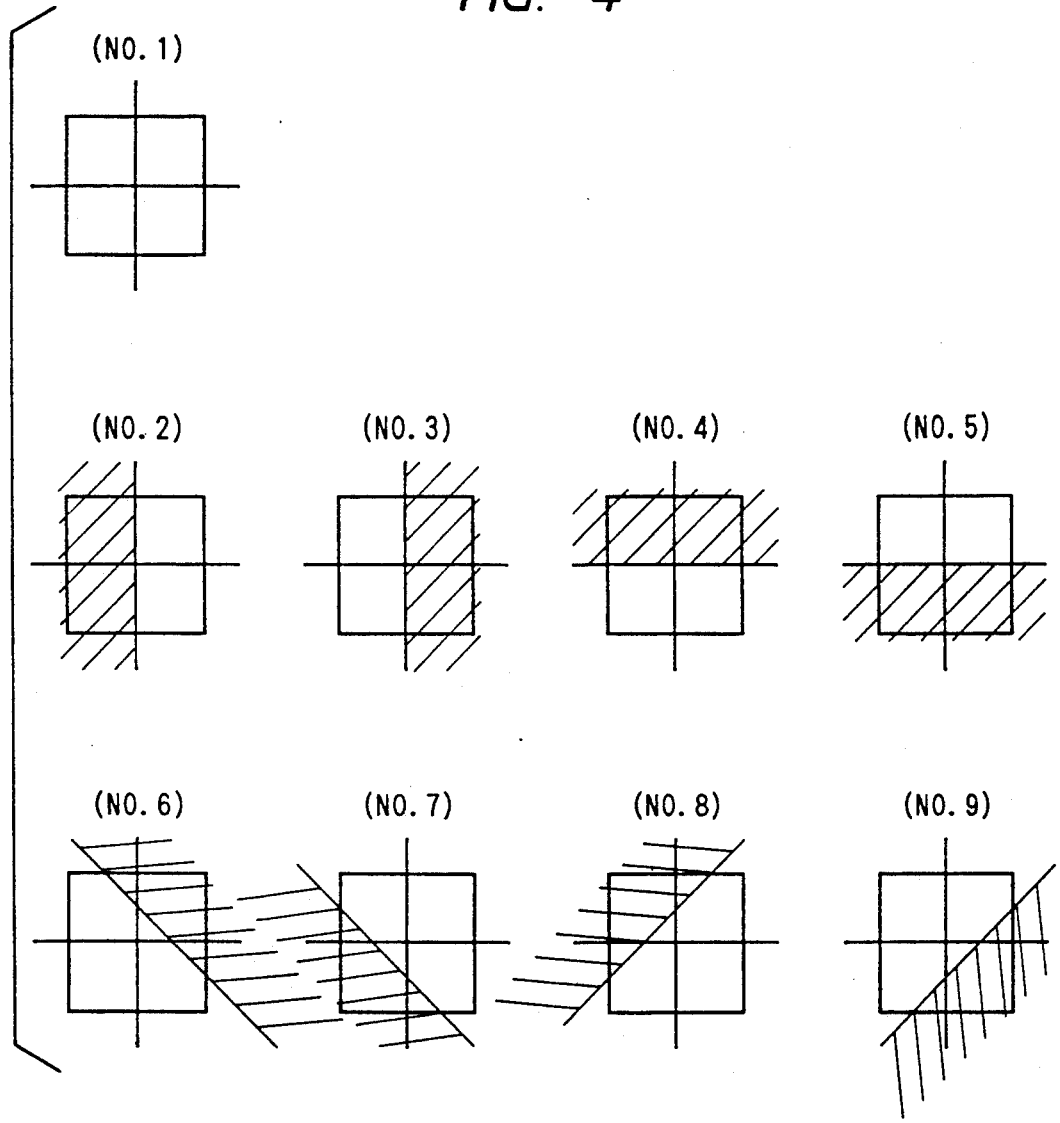
FIG. 4 shows diagrams useful in explaining the definition of the edge- direction detection.

FIG. 4 shows diagrams useful in explaining the definition of the edge-direction detection. FIG. 5 is a block diagram showing a circuit arrangement of the edge-direction detector.

Where the data block consisting of 2×2 pixels is used as a detect unit for detecting the edge direction, the edge direction may be defined by nine types of patterns as shown in FIG. 4; a pattern No. 1 having no edge, patterns Nos. 2 and 3 having edges vertically extending, patterns Nos. 4 and 5 horizontally extending, and patterns Nos. 6 to 9 having edges that are located on both sides of an oblique line and extends along the oblique line. An arrangement of a circuit capable of recognizing those patterns is shown in FIG. 5(a).

Figures 5A, 5B:
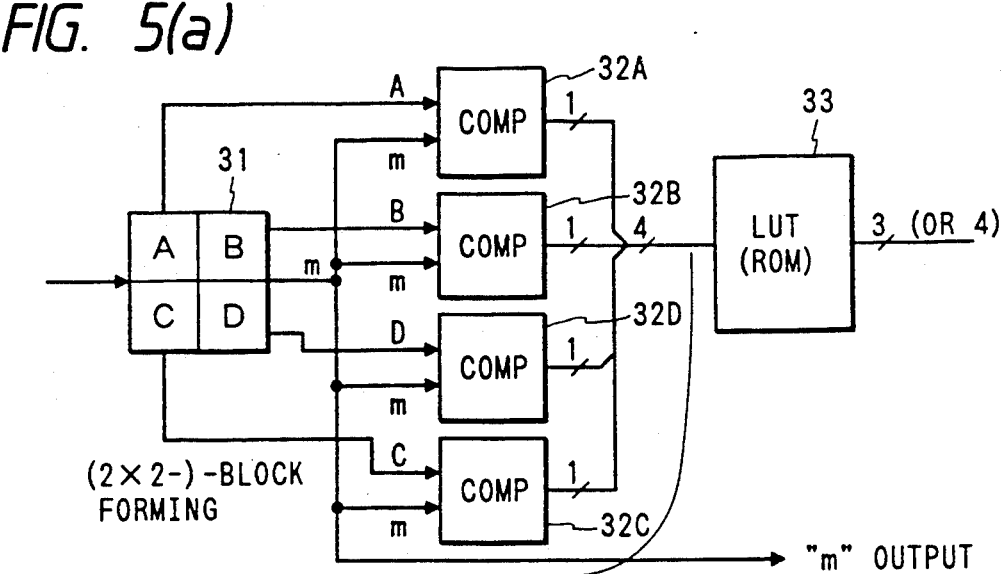
FIG. 5 is a block diagram showing a circuit arrangement of the edge-direction detector.

In FIG. 5, reference numeral 31 designates a (2×2)-block forming circuit. Comparators 32A to 32D compare respectively the values of pixels A to D in the (2×2) data block with a mean value m (=(A+B+C+D)/4) that is calculated by the (2×2)-block forming circuit 31. A LUT (look-up table) 33 is a ROM (read only memory) which receives 4-bit edge pattern signals outputted from the comparators 32A to 32D as address signals, and edge pattern signals. It is assumed that the 4-bit output data of the comparators 32A to 32D is arranged such that the pixel A is allocated to the least significant bit 0, the pixel B to bit 1, the pixel C to bit 2, and the pixel D to the most significant bit 3, and further that when the value of the pixel is larger than the mean value "m", each of those comparators 32A to 32D produces data of "1". On the assumption, 4-bit edge pattern signals "0000" to "1111" can be produced, which correspond to the position of the pixel whose value is above the mean value "m", as shown in FIG. 5(b). When the LUT 33 is addressed by any of those edge patterns signals, the LUT 33 produces the corresponding one of the edge-direction data No. 1 to No. 9 defined in FIG. 4.

Figure 6A:
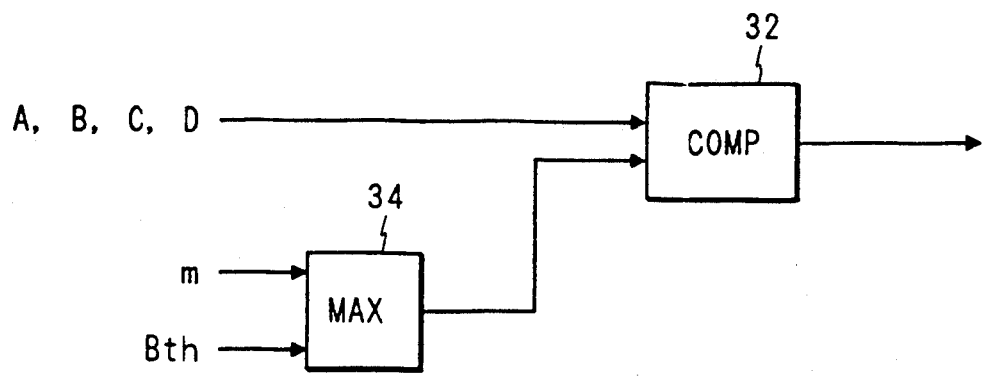
FIG. 6 shows arrangements of the comparators in the edge-direction detector.
Figure 6B:
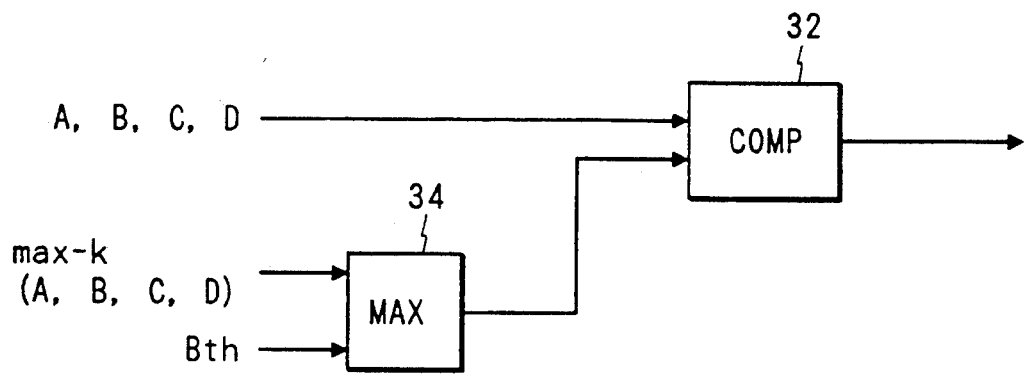
Figure 6C:
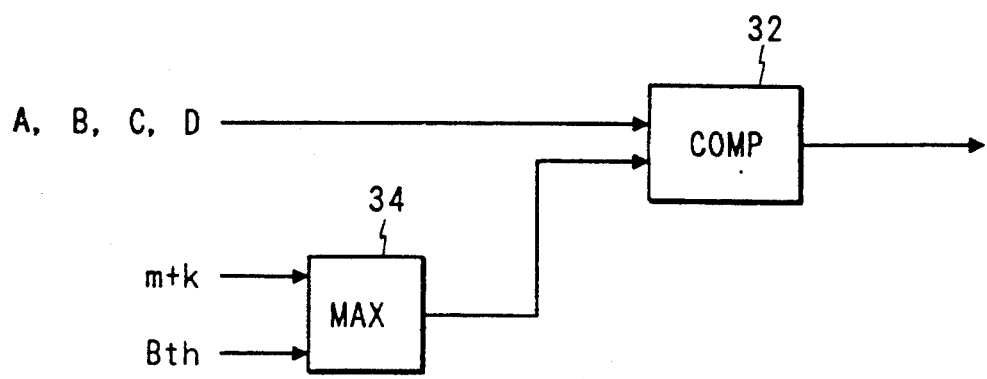
Figure 11:
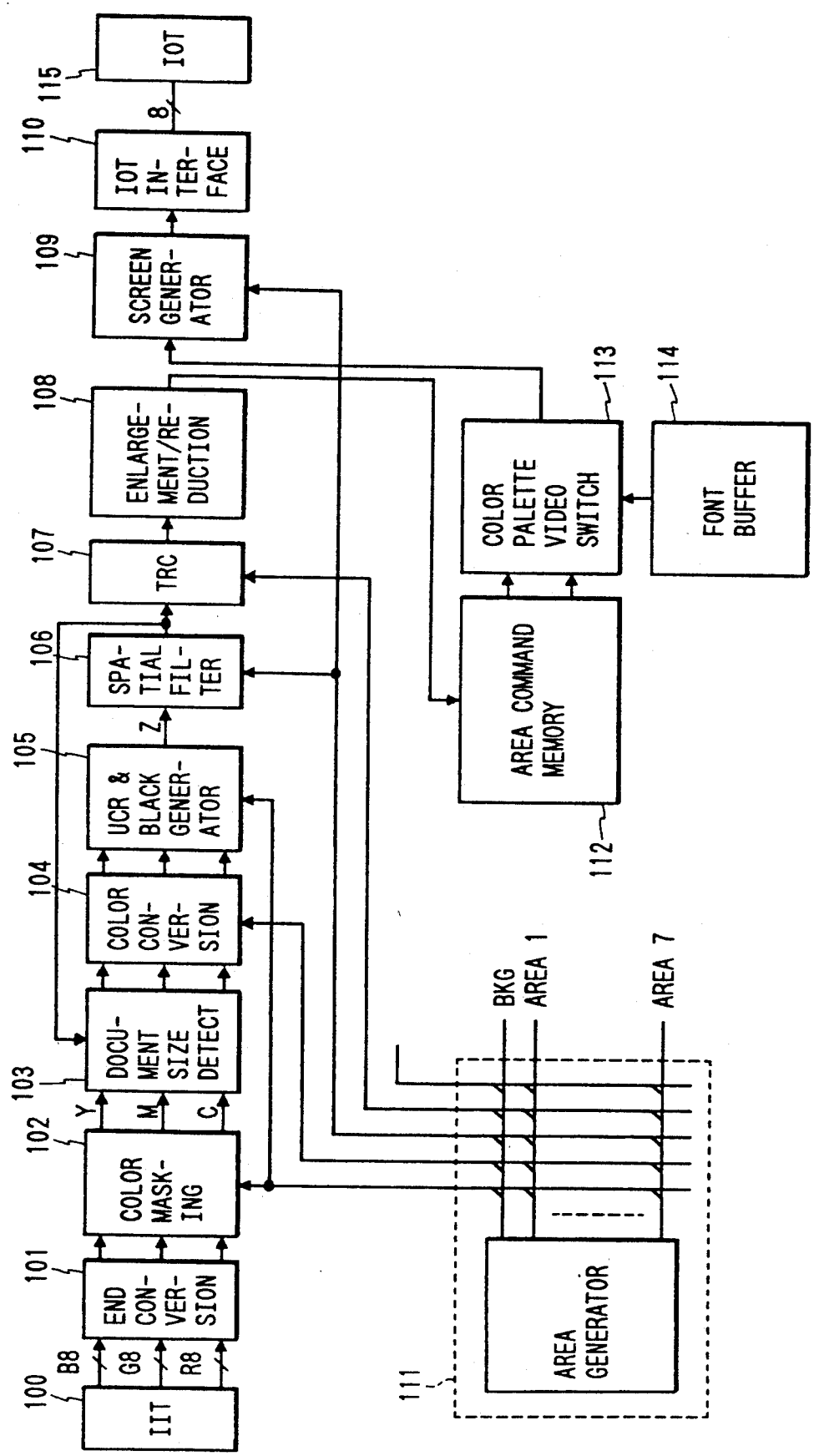
FIG. 11 is a block diagram showing an arrangement of an image processing apparatus.

FIG. 6 shows arrangements of the comparators 32A to 32D in the edge-direction detector shown in FIG. 5(a). Those comparators are arranged such that the pixel values A to D are each compared with the mean value "m", and the edge direction is detected on the basis of the position of the pixel whose value is larger than the mean value. When it is the mean value "m", for example, where a character is present above a half-tone image and a density in the background of the character changes, the portion in the image, which is not the character, provides the edge- direction data. To cope with the problem, the comparators of FIG. 6 use maximum-value (max-value) selectors 34 for selecting a value to be compared with the pixel values A to D. In the circuit of FIG. 6(a), a fixed value Bth, which is empirically determined, is applied as a threshold value for comparison to the max-value selector 34, which also receives the mean value "m". The selector selects one of those values, which is the larger. In the circuit of FIG. 6(b), the selector 34 receives the fixed value Bth and a value as the result of subtraction of a fixed value "k" from the maximum value of each of the pixel values A to D, and selects either of them, which is the larger. In the circuit of FIG. 6(c), the selector 34 receives a value as the sum of a fixed value "k" and the means value "m", and the fixed value Bth, and selected either of them, which is the larger of the two.

The edge detector 2, the edge-direction detector 12, and the edge detect/smoothing circuit 22 shown in FIGS. 1 to 3 will be described.

FIG. 7 shows diagrams for explaining an algorithm to detect the edge. FIG. 8 shows diagrams for explaining an algorithm for the smoothing circuit.

The edge detector 2 shown in FIG. 1 is arranged as shown in FIG. 7, for example. For the edge detection, a 3×3 window of the data blocks is used as shown in FIG. 7. In the figure, blocks A to I are each a pixel of 200×200 spi, which results from the averaging of the data block. Let a pixel E be a marked pixel, and us define densities in the window as follows:

$e_1 = A + B + C \ldots$ (density in the upper row)
$e_2 = G + H + I \ldots$ (density in the lower row)
$e_3 = A + D + G \ldots$ (density in the left column)
$e_4 = C + F + I \ldots$ (density in the right column)
$e_5 = A + B + D \ldots$ (density in the left upper corner)
$e_6 = F + H + I \ldots$ (density in the right lower corner)
$e_7 = B + C + F \ldots$ (density in the right upper corner)
$e_8 = D + G + H \ldots$ (density in the left upper corner).

Then, the edge is given by

Edge=max ($E_1$, $E_2$, $E_3$, $E_4$)

where $E_1 = |e_1 - e_2|$ (absolute of the difference between the densities of the upper and lower rows), $E_2 = |e_3 - e_4|$ (absolute of the difference between the densities of the right and left columns), $E_3 = |e_5 - e_6|$ (absolute of the difference between the densities of the left upper corner and the right lower corner), and $E_4 = |e_7 - e_8|$ (absolute of the difference between the densities of the right upper corner and the left lower corner). The edge value is compared with a threshold value "th". When the former is larger than the latter, control determines that it is in an edge area. In the reverse case, control determines that it is in the non-edge area. In FIG. 7(b) showing an arrangement of the detector, an edge detecting portion 41 detects an edge by using the 9-pixel data of 200×200 spi. A comparator portion 42 compares the detected edge with the threshold value "th" to determine whether the marked pixel is in the area or non-edge area.

The edge-direction detector 12 in the embodiment shown in FIG. 2 detects the edge as just mentioned and its direction as well. The edge direction is determined by finding the maximum edge of those E1 to E4, and its sign, positive or negative. For example, when the maximum edge is E1 and its sign is positive, the edge pattern No. 4 is selected for the edge direction. If the sign is negative, the pattern No. 5 is selected. When the maximum edge is E2, the edge pattern No. 2 is selected for the positive sign, and the edge No. 3 for the negative sign. When the maximum edge is E3, the edge pattern No. 8 is selected for the positive sign, and the edge No. 9 for the negative sign. When the maximum edge is E4, the edge pattern No. 6 is selected for the positive sign, and the edge pattern No. 7 for the negative sign. When no edge is present, the edge pattern No. 1 is selected.

In this way, the edge detect/smoothing circuit 22 shown in FIG. 3 detects the edge, and produces a smoothed signal "f". The simplest expression of the smoothed signal "f" is $$f=(A+B+C+D+E+F+G+H+I)/9.$$

It is very difficult to realize the expression in a hardware manner, however. One of the feasible methods is to weight pixel values as shown in FIG. 8, and to average them. In the case of FIG. 8(a), the marked pixel value is four times the original pixel value; the values of the pixels on the right and left sides of the marked pixel, and above and below the same, are two times the original pixel value; and the values of the pixels at the four corners are each equal to the original one. The pixel values thus weighted are added together and divided by 16. The result of the dividing calculation forms the smoothed signal. Accordingly, the following calculation suffices for this case.

$$f=0.0625(A+C+G+I)+0.125(B+D+F+H)+0.25E.$$

In hardware, this can be realized by shifting A, C, G, and I by 4 bits to the right, B, D, F, and H by 3 bits to the right, and E by 2 bits to the right, and adding them together.

In the case of FIG. 8(b), the value of only the marked pixel is set to be four times the original pixel value. The pixels values of those pixels are added together, and the result of the addition is divided by eight (8), thereby to provide the smoothed signal. In this case, the smoothed signal "f" is $$f=0.5E+0.125(B+D+F+H).$$

In hardware, B, D, F, and H are shifted by 3 bits to the right, and E is shifted by 2 bits to the right, and those are added together.

The font output circuit will be described.

FIG. 9 shows diagrams for explaining the font output circuit.

It is assumed that the data resolution is set at 3200 spi in the main scan direction, and is at 400 spi in the vertical scan direction, as shown in FIG. 9(a). Then, the font produced by the font output circuit is basically the called ten-thousands lines type font of 200 lines. In this instance, the font is switched from one font to another on the edge, thereby to improving a definition (sharpness) of the image. Since the font type is used in the present invention, an error occurring between the input and output can be obtained without calculation, and the error may be prestored in an LUT 43, as shown in FIG. 9(b). In this instance, address data to address the LUT 43 is the combination of edge-direction data of 3 to 4 bits and input image data (200 spi) of 8 bits, and accordingly its data width is 11 to 12 bits. With the address data, font pattern data and error data are read out of the LUT 43. Accordingly, no time to calculate the error is taken. The feedback loops of the error filters 6, 15, and 27 can be operated more quickly. Where the data preset in the LUT has the resolution of 3200 spi×400 spi, for example, the number of output dots is 32 dots. If the input data is 200, the number of the output dots is 25 dots, and the error is $200-25\times(255/32)\simeq1$.

FIG. 10 is a diagram showing relationships between the edge numbers and output font patterns.

As shown, in the font pattern for the edge No. 1, the dot grows from the center of the pattern. In the font pattern for No. 2, it grows from the left end of the pattern. For No. 3, it grows from the right end. For No 4, it grows from the center of the upper row. For No. 5, it grows from the center of the lower row. For No. 6, it grows from the right upper corner. For No. 7, it grows from the left lower end. For No. 8, it grows from the left upper corner. For No. 9, it grows from the right lower corner.

It should be understood that the present invention is not limited to the embodiments as mentioned above, but may variously be changed and modified within the scope of the appended claims. In the embodiment as mentioned above, the image data having the resolution of 400 spi is converted into block data at 200 spi. It is evident that if required, it may be converted into block data of another resolution. In the embodiment, the image data is converted into block data, the edge-direction in the data is detected, and then is outputted as font data. Alternatively, a memory may be provided preceding to the font output circuit. The edge direction data of 3 to 4 bits and 8-bit (2×2)-block averaged data are stored as image data into the memory. When comparing with the case where the image data is stored as intact in the memory, a required memory capacity of the memory can be saved, because the image data is compressed into the data of (3 to 4 bits+8 bits), with one block of (8 bits×4 pixels). Thus, the data is reduced to approximately ⅓.

As seen from the foregoing description, the present invention realizes the functions of forming the (2×2)-block data, edge-direction detection, font generation, and the feedback system including the error filter in simple hardware. Accordingly, the cost to construct the hardware is more reduced and the circuit construction is simpler than in the hardware using the digital filter and the screen generator. Further, the invention detects the edge and its direction, while guaranteeing the average value resulting from averaging the (2×2) block, and switches a font to another depending on them. Therefore, the dot attracting effect operates to minimize formation of unnatural edges. A high definition image can be reproduced, which is excellent in granular and tone reproduction characteristics, and in image quality. Hence, the present invention provides an image processing apparatus which exhibits an excellent performance for the generation copy. Even when the data resolution is converted from 400 spi×400 spi to 200 spi×200 spi, the edge component information reflects on the font switchover. Accordingly, the amount of image information can be reduced to ⅓ without deteriorating the image quality. With the reduction of the data amount, the image processing apparatus can cope with the increasing of the processing speed.

What is claimed is:

1. A high definition image generating system comprising:
   block forming means for forming as one block a plurality of adjacent pixels having multi-level density data and for calculating a density average value of the block, each pixel being subdivided into minute pixels;
   maximizing means for selecting a maximum threshold value based on a comparison of said density average value of the block and a predetermined density threshold value;

edge-direction detecting means for calculating an edge-direction value for said block by comparing the density data for each pixel of the block with said maximum threshold value;

storage means for storing font patterns for each of the minute pixels and said predetermined density threshold value, said font patterns corresponding to said edge-direction value contained in said block; and output means for selecting a font pattern stored in said storage means based on the edge-direction value of said edge-direction detecting means and for outputting density output data of each of said minute pixels of the selected font pattern.

2. A system as claimed in claim 1, further comprising:

window forming means for forming as one window a plurality of adjacent blocks, the window including a target block located within a plurality of surrounding blocks, and for calculating a maximum window edge density based on the density average value of the surrounding blocks;

edge detecting means for detecting a presence or absence of an edge in said target block based on the density average value of said target block calculated by said block forming means and the maximum window edge density; and wherein said output means selects the font pattern according to a detecting result of said edge detecting means and the edge-direction value of said edge-direction detecting means.

3. A system as claimed in claim 2, wherein said edge detecting means detects a presence or absence of an edge in said target block based on a density average value of a block consisting of 3×3 pixels with a center block of said window as said target block.

4. A system as claimed in claim 1, wherein said block forming means forms a block consisting of 2×2 pixels.

5. A system as claimed in claim 1, further comprising smoothing means for preparing smoothed data of a target block within a plurality of blocks from the density average value of said target block calculated by said block forming means and the density average value of blocks surrounding said target block; and switching means for switching output of said font pattern output means to output density data based on the smoothed data prepared by said smoothing means when said edge detecting means detects an absence of an edge.

6. A system claimed in claim 1, further comprising:

error correcting means for obtaining error data based on a difference between the density average value input to said output means and the density output data output from said output means, and for subjecting said error data to feedback to an input of said output means.

7. A high definition image generating system comprising:

window forming means for forming as one window a plurality of adjacent blocks, each block including a plurality of adjacent pixels having multi-level density data, and for calculating a density average value of each block and a maximum window edge density of the one window based on density average values of the adjacent blocks;

edge detecting means for detecting a presence or absence of an edge in a target block of the plurality of blocks based on the density average value of said target block calculated by said window forming means and the maximum window edge density; and an edge-direction detecting means for detecting an edge direction contained in said target block.

8. A system as claimed in claim 7, wherein said edge detecting means detects a presence or absence of an edge in the target block based on the density average value of a 3×3 block with a center block of said window as the target block.

9. A system as claimed in claim 7, wherein said window forming means forms said plurality of blocks, each comprising of 2×2 pixels as one block.

* * * * *